(12) United States Patent
Ferrara et al.

(10) Patent No.: US 10,754,947 B2
(45) Date of Patent: Aug. 25, 2020

(54) SYSTEM, METHOD AND APPARATUS FOR USABLE CODE-LEVEL STATISTICAL ANALYSIS WITH APPLICATIONS IN MALWARE DETECTION

(71) Applicant: International Business Machines Corporation, Armonk, NY (US)

(72) Inventors: Pietro Ferrara, White Plains, NY (US); Marco Pistoia, Amawalk, NY (US); Omer Tripp, Bronx, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 70 days.

(21) Appl. No.: 14/954,338

(22) Filed: Nov. 30, 2015

(65) Prior Publication Data

US 2017/0154182 A1  Jun. 1, 2017

(51) Int. Cl.
| | |
|---|---|
| G06F 21/56 | (2013.01) |
| G06F 11/36 | (2006.01) |
| G06F 8/75 | (2018.01) |
| G06F 8/77 | (2018.01) |
| G06N 5/00 | (2006.01) |

(52) U.S. Cl.
CPC .......... *G06F 21/563* (2013.01); *G06F 8/75* (2013.01); *G06F 8/77* (2013.01); *G06F 11/3604* (2013.01); *G06N 5/00* (2013.01)

(58) Field of Classification Search
CPC .... G06F 21/563; G06F 11/3688; G06F 17/18; G06F 11/3668; G06F 8/77; G06F 11/3604; G06F 8/75; G06N 5/00
See application file for complete search history.

(56) References Cited

U.S. PATENT DOCUMENTS

| | | | |
|---|---|---|---|
| 7,409,718 B1* | 8/2008 | Hong | G06F 21/566 726/24 |
| 7,519,998 B2 | 4/2009 | Cai et al. | |
| 8,640,101 B2 | 1/2014 | Spurlin | |
| 8,800,042 B2 | 8/2014 | Sima et al. | |
| 8,806,441 B2 | 8/2014 | Chandra et al. | |
| 2005/0015752 A1 | 1/2005 | Alpern et al. | |
| 2005/0216426 A1* | 9/2005 | Weston | G06K 9/6215 706/12 |

(Continued)

OTHER PUBLICATIONS

Rieck et al. "Learning and classification of malware behavior." Detection of Intrusions and Malware, and Vulnerability Assessment. Springer Berlin Heidelberg, 2008. 108-125.

(Continued)

*Primary Examiner* — Joseph P Hirl
*Assistant Examiner* — J. Brant Murphy
(74) *Attorney, Agent, or Firm* — Daniel P. Morris; McGinn IP Law Group, PLLC

(57) ABSTRACT

A method, including identifying over a set of classified applications a set of discriminating features, determining via code analysis, when a first application is subjected to classification, positions of the first application's code that correspond to discriminating features, and forwarding to a classification algorithm, such that according to its output the code fragments corresponding to the discriminating features are reported beyond a determination itself of the discriminating features.

20 Claims, 11 Drawing Sheets

(56) References Cited

U.S. PATENT DOCUMENTS

| | | | |
|---|---|---|---|
| 2006/0026675 A1* | 2/2006 | Cai | G06F 21/562 726/22 |
| 2007/0217676 A1* | 9/2007 | Grauman | G06K 9/4671 382/170 |
| 2008/0033899 A1* | 2/2008 | Barnhill | G06K 9/6228 706/48 |
| 2008/0109041 A1* | 5/2008 | de Voir | A61B 5/04017 607/7 |
| 2008/0215513 A1* | 9/2008 | Weston | G06K 9/6231 706/13 |
| 2008/0233576 A1* | 9/2008 | Weston | C12Q 1/6883 435/6.12 |
| 2010/0293451 A1* | 11/2010 | Carus | G06N 99/005 715/230 |
| 2011/0125747 A1* | 5/2011 | Gartung | G06F 17/30707 707/737 |
| 2012/0150859 A1* | 6/2012 | Hu | G06Q 10/00 707/737 |
| 2013/0318607 A1* | 11/2013 | Reed | G06F 11/3062 726/23 |
| 2014/0196010 A1 | 7/2014 | Balachandran | |
| 2015/0381644 A1* | 12/2015 | Lee | H04L 63/1425 726/23 |
| 2016/0021174 A1* | 1/2016 | De Los Santos Vilchez | H04L 43/10 709/201 |
| 2017/0177995 A1* | 6/2017 | Hillar | G06N 3/08 |

OTHER PUBLICATIONS

Eisenbarth et al., "Locating features in source code." Software Engineering, IEEE Transactions on 29.3 (2003): 210-224.

Eaddy et al, "Cerberus: Tracing requirements to source code using information retrieval, dynamic analysis, and program analysis." Program Comprehension, 2008. ICPC 2008. The 16th IEEE International Conference on. IEEE, 2008.

Antkiewicz et al., "Automatic extraction of framework-specific models from framework-based application code." Proceedings of the twenty-second IEEE/ACM international conference on Automated software engineering. ACM, 2007.

* cited by examiner

SYSTEM, METHOD AND APPARATUS FOR USABLE CODE-LEVEL STATISTICAL ANALYSIS WITH APPLICATIONS IN MALWARE DETECTION

BACKGROUND OF THE INVENTION

Field of the Invention

The disclosed invention relates generally to a system, apparatus and method for code-level statistical analysis, and more particularly, but not by way of limitation, relating to a system, apparatus and method for usable code-level statistical analysis with applications in malware detection.

Description of the Related Art

Code-level analysis is a growing need. Both the size and the complexity of modern software systems are constantly growing. Challenges include use of complex frameworks and third-party libraries, obfuscation (for IP protection), dependence on the environment (e.g., cloud VMs, physical devices or containers), etc. In parallel, the properties of interest for analysis are often nontrivial, which adds yet another dimension of complexity. As an example, the landscape of security threats has become rich and diversified, with many new application-level threats and threat categories discovered every year, which creates a difficult challenge for security verification. All these different challenges due to software and property complexity have led to the point where automation is absolutely essential.

These same sources of complexity are also now posing a challenge to classical forms of static analysis, such as abstract interpretation, which create a bottom-up model of the program's semantics via a fixpoint process. Often constructs like exception handlers and reflection leads the analysis to an overly conservative solution, which limits its practical value.

In light of the challenges faced by traditional static program analysis, recently there is a trend of combining static analysis with machine-/statistical-learning techniques so as to empirically overcome noise introduced by certain specific code patterns/constructs. This has proven extremely effective, pushing the precision of static program analysis to another level.

What is lost along this evolutionary process (from traditional code analysis to analysis involving also machine learning) is the ability to relate the response provided by the analysis to the query at hand to code-level artifacts. In the past, the analysis would be able to generate a so-called code-level counterexample, in the case the property is determined to be violated, such that the user can reason about the problem (deciding if it's a true warning, and if so, how to address it). With statistical analysis, different aspects of the program are abstracted away as feature vectors, and so the report, while being more precise, is also completely opaque.

Therefore, there is need for providing a code level statistical analysis that is more efficient and usable in malware detection.

SUMMARY OF INVENTION

In view of the foregoing and other problems, disadvantages, and drawbacks of the aforementioned background art, an exemplary aspect of the disclosed invention provides a system, apparatus, and method of providing for usable code-level statistical analysis with applications in malware detection.

One example aspect of the disclosed invention provides a method, including identifying over a set of classified applications a set of discriminating features, determining via code analysis, when a first application is subjected to classification, positions of the first application's code that correspond to discriminating features, and forwarding to a classification algorithm, such that according to its output the code fragments corresponding to the discriminating features are reported beyond a determination itself of the discriminating features.

In a case of malware detection, the classification is determined as either "malicious" or "benign". Identifying of the discriminating features is performed offline. The identifying of discriminating features includes identifying, out of a plurality of available features, those that have above a predetermined level of discriminatory power, and outputting, via an algorithm, the discriminating features, where a feature is considered of sufficient discriminatory power from its frequency of occurrence. The identifying of features that have above a predetermined level of discriminatory power, include features that arise with a greater frequency in malicious applications compared to benign applications or vice versa.

The method can also include for or each feature, counting a number of vectors which are sets including feature vectors for the malicious and benign applications, respectively such that a non-default vector is determined, and normalizing the counts of the number of vectors by dividing by an overall number of benign and malicious vectors, wherein the outputting of the discriminating features of after normalizing the counts of the number of vectors, where a feature is considered of sufficient discriminatory power if its frequency of occurrence in malicious or benign application is greater than its frequency of occurrence in benign or malicious application by a predetermined factor. The set of discriminating features are machine-learnable aspects of a program's code that hold true of most applications with one classification but not with other classifications.

The determining of the positions of the first application's code, further includes given the set of discriminating features obtained through an algorithm, determining for correlations between the features and the traces arising in the input first application, and computing a mapping function from traces to discriminating features.

The method further incudes to enable the binding to a program's text, when performing static analysis of the first application in test mode as opposed to offline training, retaining as metadata a source position of each statement, if information of the source position is missing, substituting the information with a fully qualified class name, method signature and call site of every operation along the trace, while statically analyzing an input application, storing the code positions corresponding to the operation traces it computes, and when a machine learning engine makes a determination, tracing model discriminative features consistent with the determination are highlighted in a report.

In another example aspect of the disclosed invention, there is a server, including a processor, and a computer readable medium storing a program executed by the processor, wherein the processor identifies over a set of classified applications a set of discriminating features, wherein the processor determines via code analysis, when a first application is subjected to classification, positions of the first application's code that correspond to discriminating features, and wherein the processor forwards to a classification algorithm, such that according to its output the code fragments corresponding to the discriminating features are reported beyond a determination itself of the discriminating features.

In a case of malware detection, the classification is determined as either "malicious" or "benign". The identifying of the discriminating features is performed offline. The processor identifying of discriminating features includes the processor identifying, out of a plurality of available features, those that have above a predetermined level of discriminatory power, and the processor outputting, via an algorithm, the discriminating features, where a feature is considered of sufficient discriminatory power from its frequency of occurrence. The identifying of features that have above a predetermined level of discriminatory power, include features that arise with a greater frequency in malicious applications compared to benign applications or vice versa.

For each feature, the processor counting a number of vectors which are sets including feature vectors for the malicious and benign applications, respectively such that a non-default vector is determined, the processor normalizing the counts of the number of vectors by dividing by an overall number of benign and malicious vectors, and the processor outputting of the discriminating features after normalizing the counts of the number of vectors, where a feature is considered of sufficient discriminatory power if its frequency of occurrence in malicious or benign application is greater than its frequency of occurrence in benign or malicious application by a predetermined factor.

The set of discriminating features are machine-learnable aspects of a program's code that hold true of most applications with one classification but not with other classifications. The processor determining of the positions of the first application's code, further includes given the set of discriminating features obtained through an algorithm, the processor determining for correlations between the features and the traces arising in the input first application, and the processor computing a mapping function from traces to discriminating features.

To enable the binding to a program's text, when performing static analysis of the first application in test mode as opposed to offline training, the processor retaining as metadata a source position of each statement, if information of the source position is missing, the processor substituting the information with a fully qualified class name, method signature and call site of every operation along the trace, while statically analyzing an input application, the processor storing the code positions corresponding to the operation traces it computes, and when a machine learning engine makes a determination, the processor tracing model discriminative features consistent with the determination are highlighted in a report. The server can be implemented in the clouds.

Yet another example aspect of the disclosed invention includes a method including identifying over a set of classified applications a set of discriminating features, and determining via code analysis, when a first application is subjected to classification, positions of the first application's code that correspond to discriminating features.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF DRAWINGS

The exemplary aspects of the invention will be better understood from the following detailed description of the exemplary embodiments of the invention with reference to the drawings.

FIG. 5 illustrates a malware report according to an example embodiment.

DETAILED DESCRIPTION OF A PREFERRED EMBODIMENTS

Figure 1:
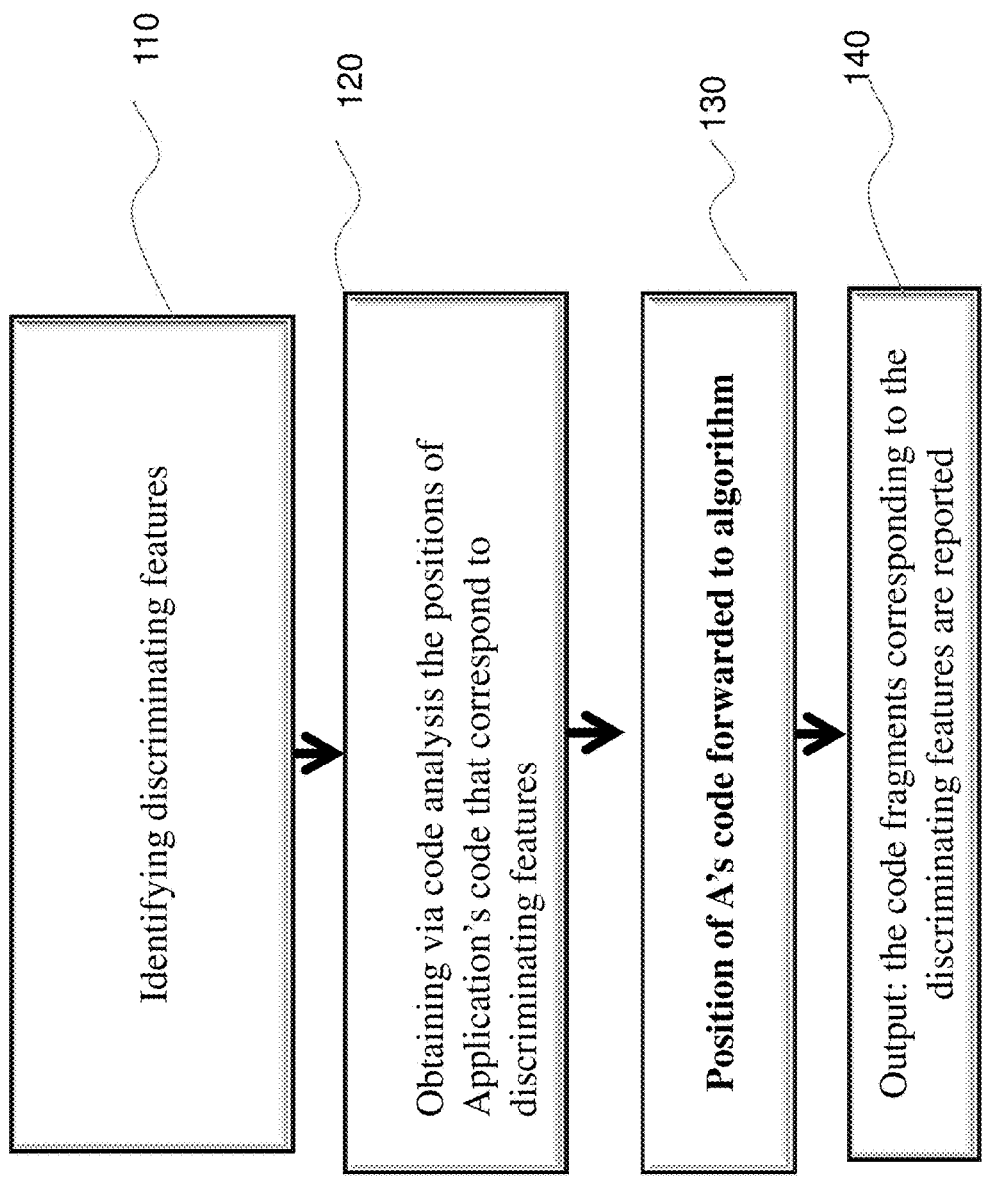
FIG. 1 illustrates a method for usable code-level statistical analysis in an example embodiment.

The invention will now be described with reference to the drawing figures, in which like reference numerals refer to like parts throughout. It is emphasized that, according to common practice, the various features of the drawing are not necessary to scale. On the contrary, the dimensions of the various features can be arbitrarily expanded or reduced for clarity. Exemplary embodiments are provided below for illustration purposes and do not limit the claims.

Referring to FIG. 1, one of the features of the disclosed invention is to identify offline, over a set of classified applications (where in the case of malware detection the classification is either as "malicious" or as "benign") a set of "discriminating features" (Step 110). These are machine-learnable aspects of the program's code that hold true of most applications with one classification but not with other classifications (e.g., a feature F that is true of most applications that are "malicious" but hardly any application that is "benign").

Since classification algorithms usually do not provide code-level explanations about why an application is classified as malware, there is developed a novel feature of augmenting the statistical classification process with a report pointing into the code. This can be done, for example, by correlating the traces exhibited by the application with a catalog of discriminating features.

Given this step of identifying discriminating features (Step 110), the next step—when a new application A is subjected to classification (say malware analysis)—is to obtain via code analysis the positions of A's code that correspond to discriminating features (step 120).

The position of application A is then forwarded to the classification algorithm (step 130), such that according to its output (e.g. "malware" vs "benign") the code fragments corresponding to the discriminating features are reported to the user beyond the determination itself (step 140).

Therefore, in further detail, to enable validation of, and action based upon, its benign/malicious determination, an example embodiment reports evidence in support of the determination. First, as part of offline training, where the application records features that have high discriminative power (either occurring in most malicious apps and almost none of the benign apps or vice versa) step 110. Then, while statically analyzing an input app, the present system stores the code positions corresponding to the operation traces it computes (step 120). Finally, when the machine learning engine makes a determination, the system traces that model discriminative features consistent with the determination are highlighted in the report (step 140).

Please note that these features are of general applicability. In the examples mobile malware detection is shown, and in particular, detection of malicious mobile based applications. Therefore, other features other than malware detection could be used.

The features are combined into a feature vector (by aggregating over all traces, as explained above), which the system of feeds into a supervised machine-learning classifier. The classifier—utilizing a support-vector machine (SVM) algorithm can trained offline over both malicious and benign applications.

The static analysis that the system of disclosed embodiment performs is a lightweight form of data-flow analysis—to compute regular traces—that is far cheaper than data-flow reachability. As such, there is no need to statically track or approximate argument values, memory manipulations or other aspects of the program's state that are expensive to model. To perform the analysis efficiently, the present system exploits the fact that it distributes over traces, thereby falling within the scope of the IFDS framework for inter-procedural distributive data-flow analysis by means of abstract interpretation.

Figure 2:
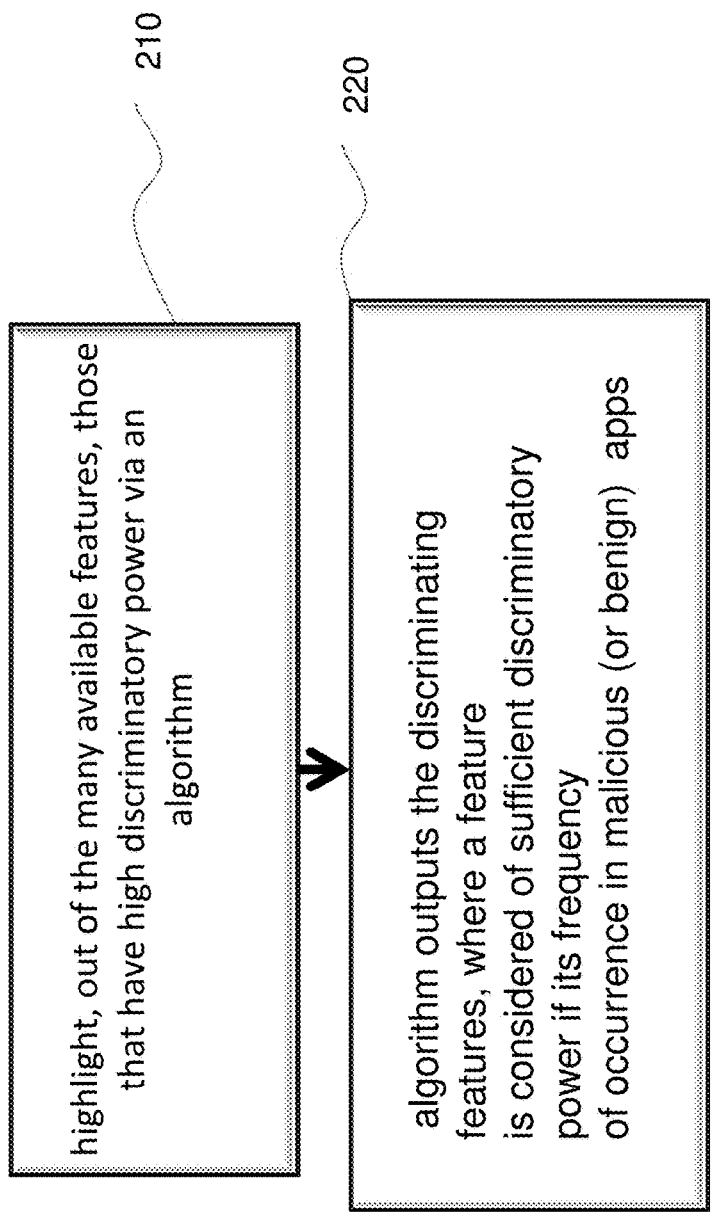
FIG. 2 illustrates further detail for usable code-level statistical analysis in an example embodiment.

Referring to FIGS. 1 and 2, the step of identifying discriminating features in step 110 can include the following example technique. The first step (210) is to highlight, out of the many available features, those that have high discriminatory power. Such features are those that arise significantly more often in malicious compared to benign applications (or vice versa). The determination or calculation can be done through an algorithm. The next step is that the algorithm outputs (step 220) the discriminating features, where a feature is considered of sufficient discriminatory power if its frequency of occurrence in malicious (or benign) apps is greater than its frequency of occurrence in benign (or malicious) apps. An example algorithm is provided in the following.

Algorithm 1 summarizes this computation.

```
begin
    input: set V_m of malware vectors.
    input: set V_b of benign vectors
    input: threshold t
    output: set F of discriminating features
    C_b, C_m ← [ . . . 0 . . . ] // feat. counts
    foreach feature f do
        C_b ← C_b[f ↦ #{v ∈ V_b: v(f) in nondef.}]
        C_m ← C_m[f ↦ #{v ∈ V_m: v(f) in nondef.}]
    end
    F ← ∅ foreach feature f ∈ C_m s.t. $\frac{C_m(f)}{|R_m|} \geq \frac{C_b(f)}{|R_b|} \times t$ do F ← F ∪ {f}
    end
    return F
end
```

Figure 3:
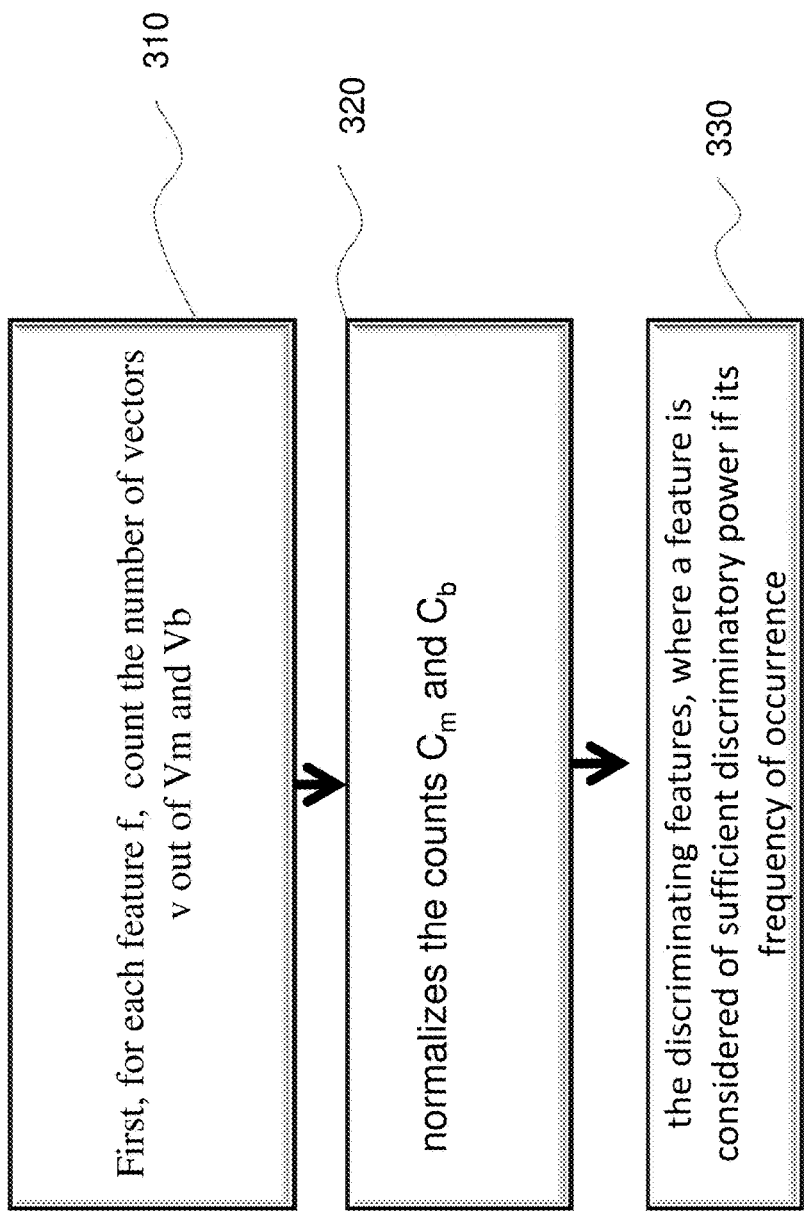
FIG. 3 illustrates a flowchart of determining discriminatory power of features in an example embodiment.

FIG. 3 illustrates a flowchart of determining discriminatory power of features in an example embodiment. Therefore, referring to FIG. 3, first, for each feature f, a computer counts the number of vectors v out of Vm and Vb—which are the sets containing the feature vectors for the malicious and benign apps, respectively—such that v(f) is nondefault (i.e., neither false for happens-before features nor 0 for multiplicity features) (step 310). Then a computer normalizes the counts $C_m$ and $C_b$ by dividing them by the overall numbers of benign and malicious vectors (|Rb| and |Rm|, respectively) step 320. The first algorithm outputs (step 330) the discriminating features, where a feature is considered of sufficient discriminatory power if its frequency of occurrence in malicious (or benign) apps is greater than its frequency of occurrence in benign (or malicious) apps by a factor of t or more, where t is a parameter.

Figure 4:
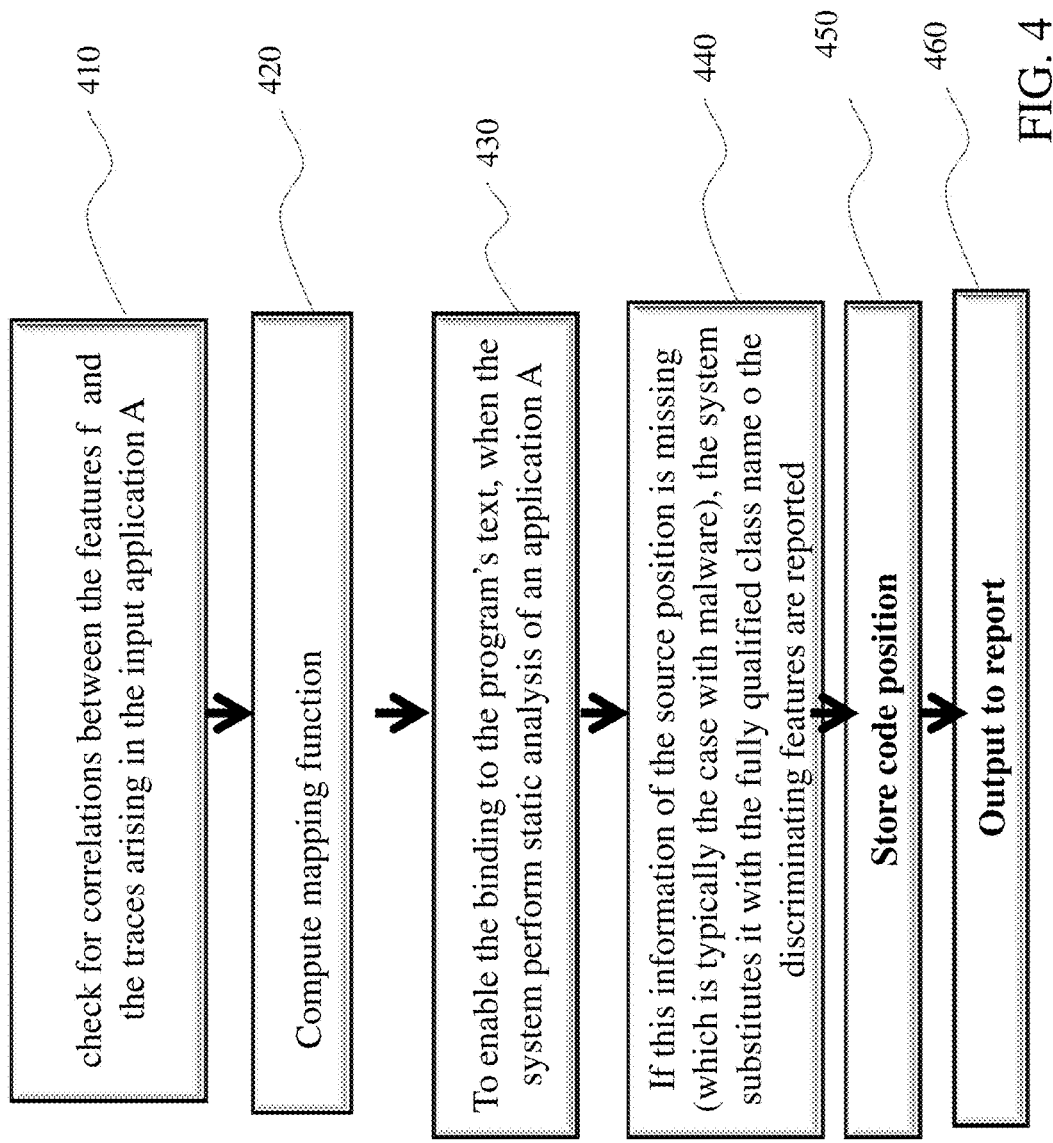
FIG. 4 a flow chart of obtaining via code analysis the positions of Application's code in an example embodiment.

Referring to FIG. 4, the step of obtaining via code analysis the positions of Application's code 120 in FIG. 1 is detailed further.

Given set F of discriminating features obtained through Algorithm 1, the next step is to check for correlations between the features f and the traces Tr(A) arising in the input application A (step 410). This aspect of the analysis leverages the fact that the features pertain to, and are derived from, the code.

In particular, the system computes mapping function from traces to discriminating features that t models, which is formally defined (step 420). To enable the binding to the program's text, when the system perform static analysis of an application A in test mode (as opposed to offline training), the system retains as metadata the source position of each statement (step 430). If this information of the source position is missing (which is typically the case with malware), the system substitutes it with the fully qualified class name, method signature and call site of every operation along the trace (step 440).

Then, while statically analyzing an input app, the system stores the code positions corresponding to the operation traces it computes (step 450). Finally, when the machine learning engine makes a determination, traces that model discriminative features consistent with the determination are highlighted in the report (step 460).

FIG. 5 illustrates a malware report according to an example embodiment. For example, FIG. 5 presents a fragment from the report. The report contains rich code-level information on the suspect traces (the "Evidence" column), as well as the particular features for which they are suspected (the "Reason" column). As noted above, this is useful for manual verification whether the analysis has reached the correct conclusion, and also as a means to gain immediate insight as to the spread of new malware instances/families and their signature/characteristics.

Figure 6:
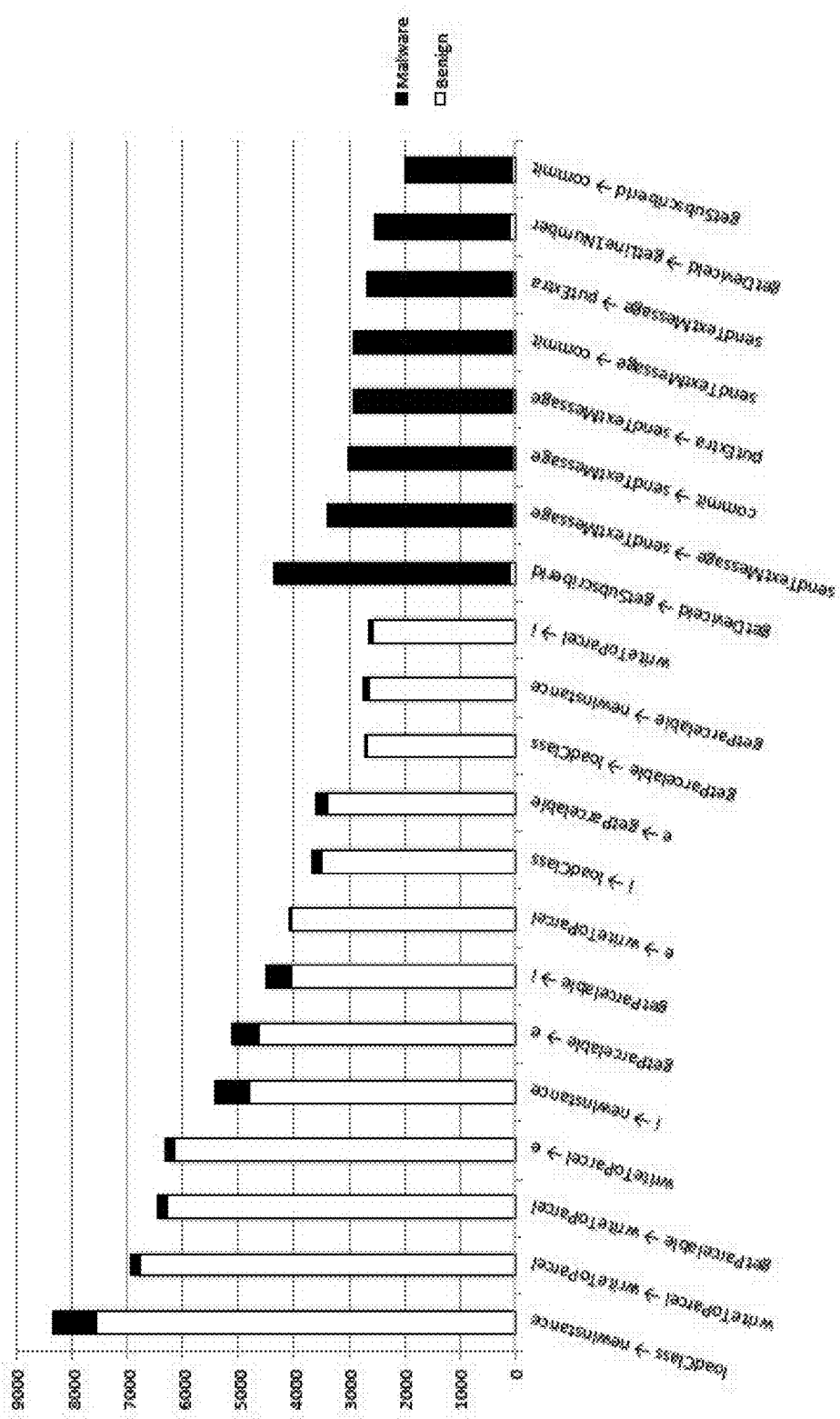
FIG. 6 illustrates features that distinguish most significantly between malicious and benign applications from experiments.

FIG. 6 illustrates features that distinguish most significantly between malicious and benign applications from experiments.

As qualitative insight into the discriminative power of happens-before and multiplicity features, FIG. 6 is provided to show the main discriminative features according to predetermined benchmarks. For the purpose of FIG. 6, a happens-before feature is considered frequent if it occurs in at least 10% of malicious or benign apps. To give a concrete illustration of how these features manifest in real-world malware applications, the code fragments are taken into account. Example features regarding code fragments are shown in FIG. 6.

It is to be emphasized that this method is orthogonal to the classification algorithm (be it a machine-learning algorithm using the same or different features, a rule-based classification algorithm, etc). The steps are describing identifying the discriminating features offline and then, during deployment, correlating them with the input application's code, are of general applicability.

Exemplary Hardware and Cloud Implementation

Figure 7:
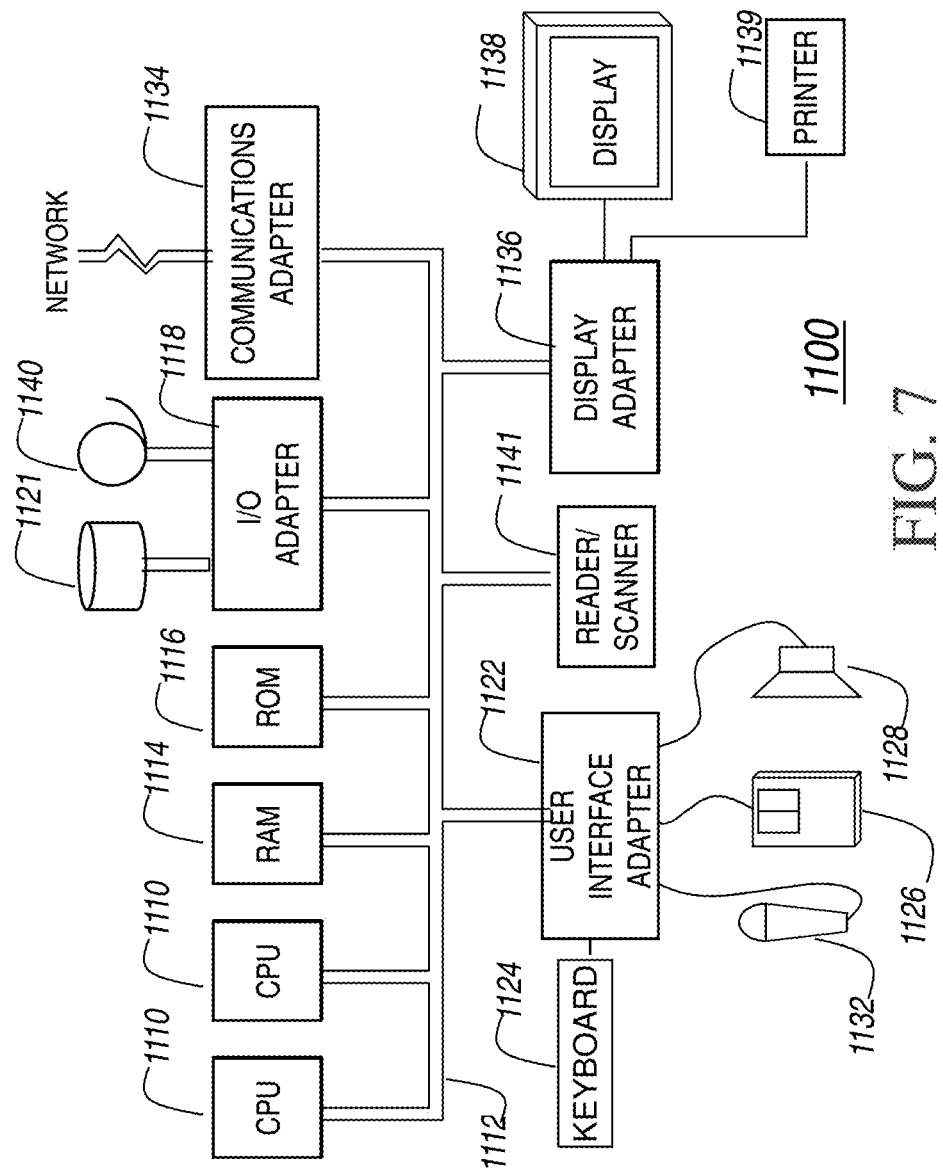
FIG. 7 illustrates an exemplary hardware/information handling system for incorporating the exemplary embodiment of the invention therein.

FIG. 7 illustrates another hardware configuration of an information handling/computer system 1100 in accordance with the disclosed invention and which preferably has at least one processor or central processing unit (CPU) 1110 that can implement the techniques of the invention in a form of a software program.

The CPUs 1110 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing storage media tangibly embodying a program of machine-readable instructions executable by a digital data processor incorporating the CPU 1110 and hardware above, to perform the method of the invention.

This signal-bearing storage media may include, for example, a RAM contained within the CPU 1110, as represented by the fast-access storage for example.

Figure 8:
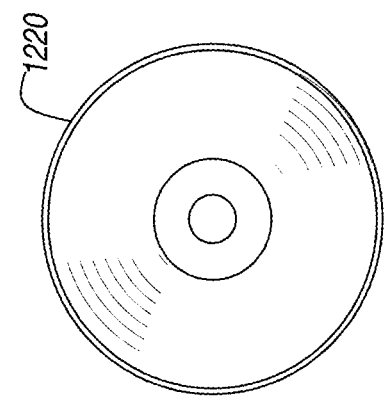
FIG. 8 illustrates a signal-bearing storage medium for storing machine-readable instructions of a program that implements the method according to the exemplary embodiment of the invention.
Figure 8:
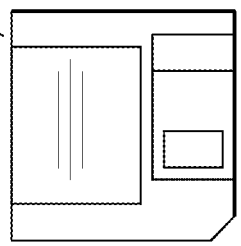

Alternatively, the instructions may be contained in another signal-bearing storage media 1200, such as a magnetic data storage diskette 1210 or optical storage diskette 1220 (FIG. 8), directly or indirectly accessible by the CPU 1210.

Whether contained in the diskette 1210, the optical disk 1220, the computer/CPU 1210, or elsewhere, the instructions may be stored on a variety of machine-readable data storage media.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
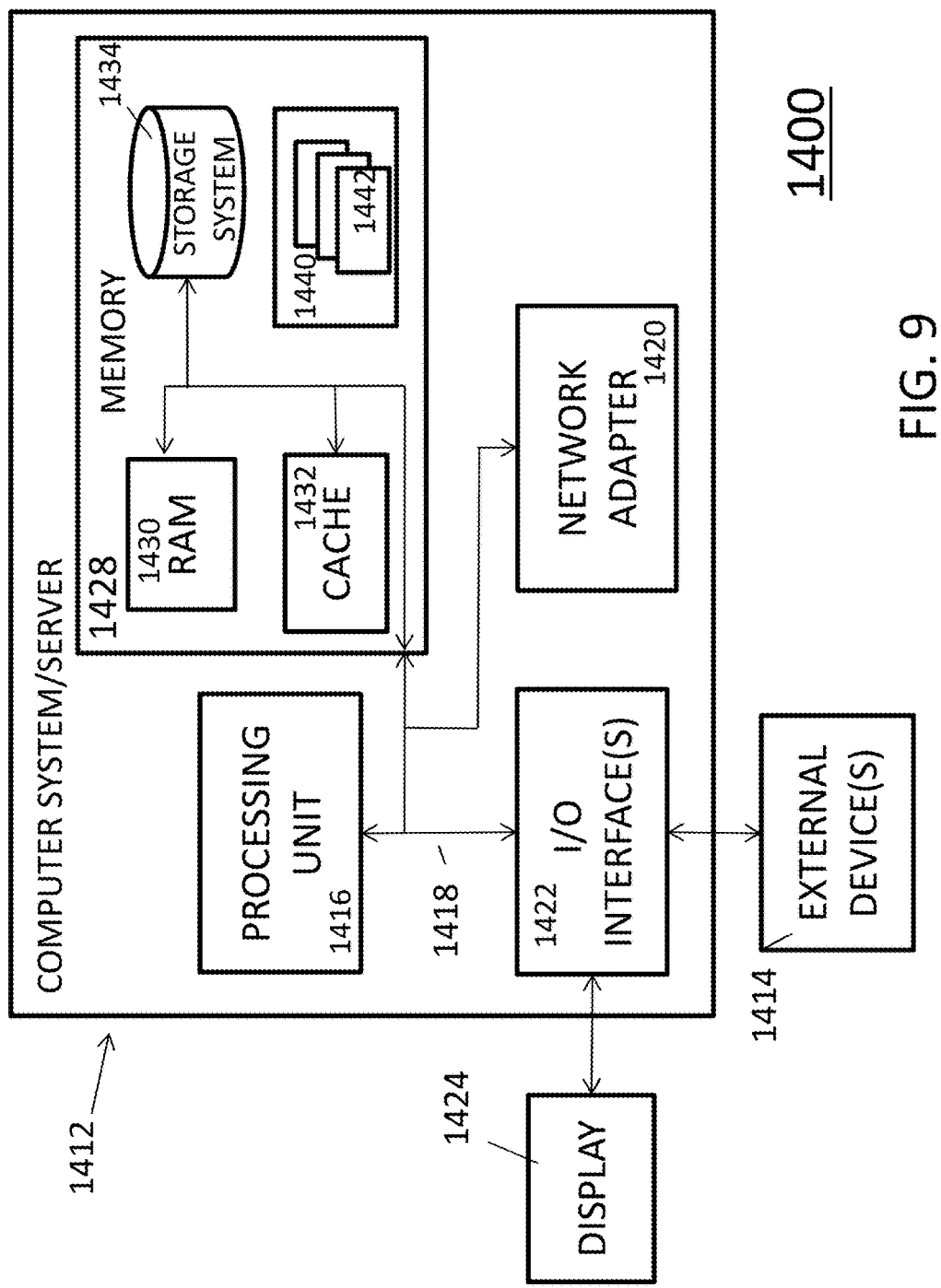
FIG. 9 depicts a cloud computing node according to an embodiment of the present invention.

Referring now to FIG. 9, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove.

In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 1412 in cloud computing node 1400 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 10:
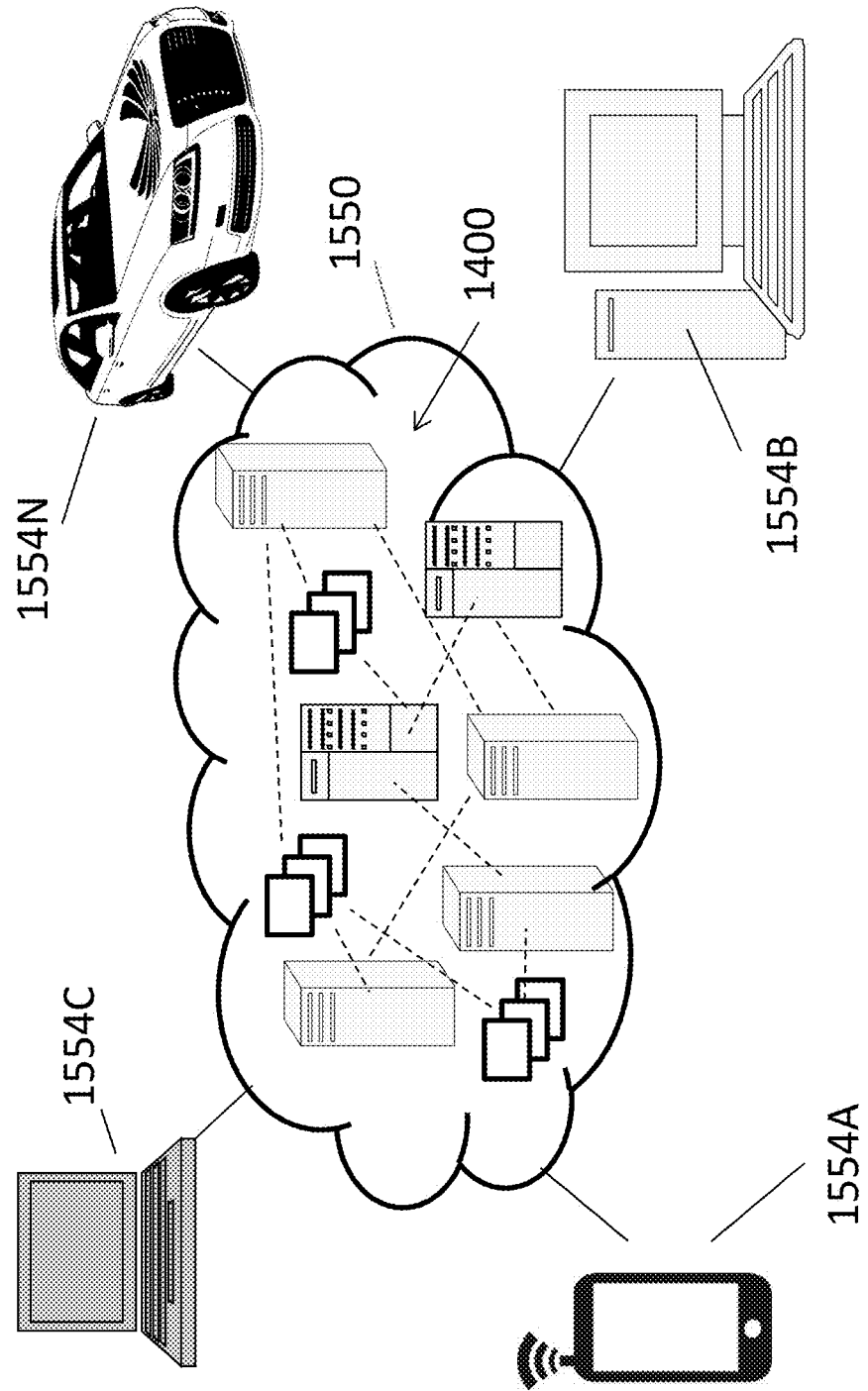
FIG. 10 depicts a cloud computing environment according to an embodiment of the present invention.

Referring now to FIG. 10, illustrative cloud computing environment 1550 is depicted. As shown, cloud computing environment 1550 comprises one or more cloud computing nodes 1400 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1400 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 10 are intended to be illustrative only and that computing nodes 1400 and cloud computing environment 1550 can communicate with any type of computerized device over any type of network and/or network addressable connection (e.g., using a web browser).

Figure 11:
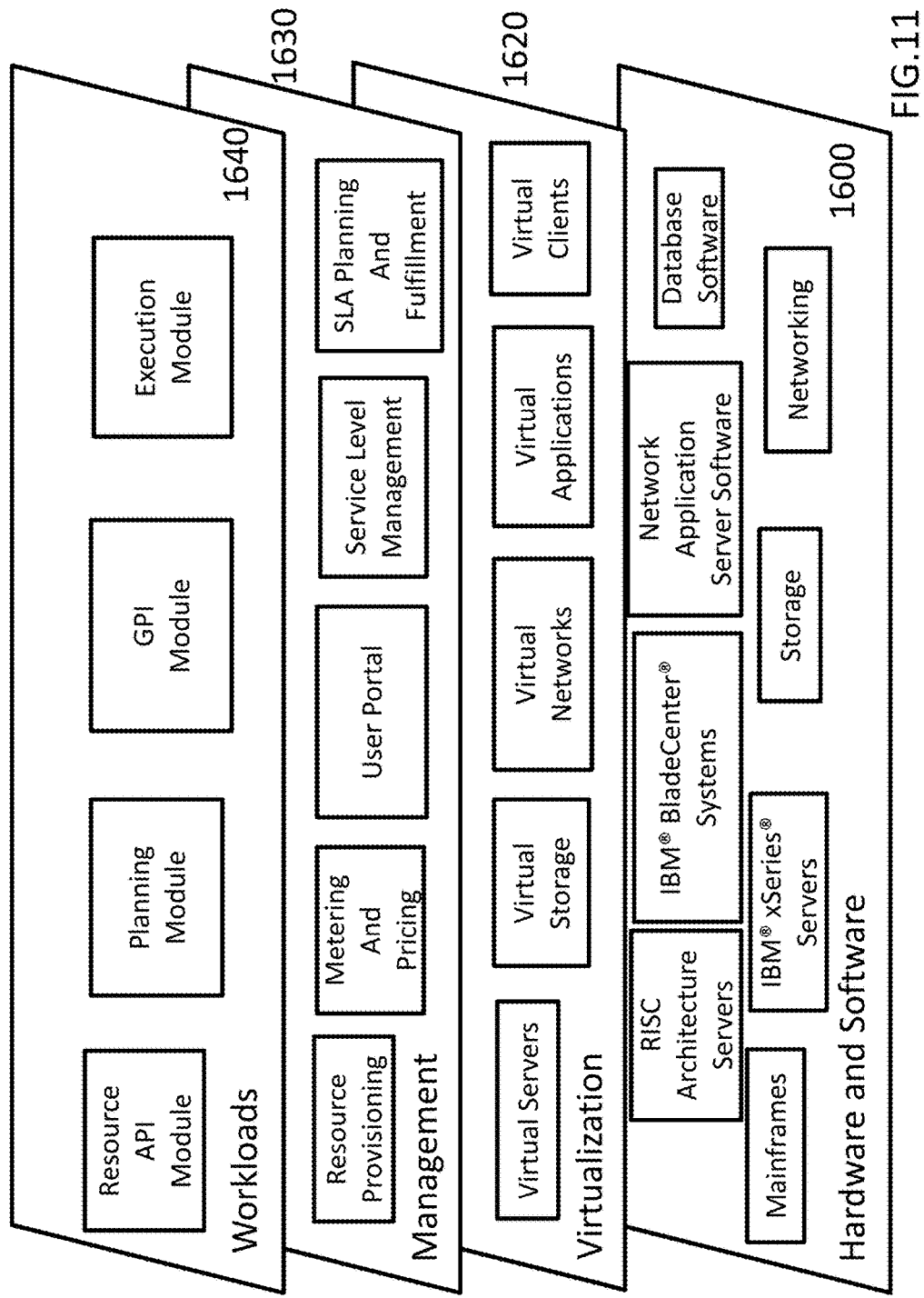
FIG. 11 depicts abstraction model layers according to an embodiment of the present invention.

Referring now to FIG. 11, a set of functional abstraction layers provided by cloud computing environment 1550 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1662 provides an abstraction layer from which the following examples of virtual entities may be provided: virtual servers; virtual storage; virtual networks, including virtual private networks; virtual applications and operating systems; and virtual clients.

In one example, management layer 1664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1666 provides examples of functionality for which the cloud computing environment may be utilized. Examples of workloads and functions which may be provided from this layer include such functions as mapping and navigation; software development and lifecycle management; virtual classroom education delivery; data analytics processing; transaction processing; and, more particularly relative to the disclosed invention, the APIs and run-time system components of generating search autocomplete suggestions based on contextual input.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method, comprising:
   identifying over a set of classified applications a set of discriminating features to differentiate between different classifications of the applications;
   determining via code analysis, when a first application is subjected to classification, positions of the first application's code that correspond to discriminating features by checking for correlations between the discriminating features and operation traces arising in the first application; and
   forwarding the positions of the first application's code that correspond to the discriminating features to a classification algorithm, such that according to its output code fragments corresponding to the discriminating features are reported.

2. The method according to claim 1, wherein in a case of malware detection, the classification is determined as either "malicious" or "benign".

3. The method according to claim 1, wherein the identifying of the discriminating features is performed as part of offline training, and
   wherein the offline training includes combining discriminating features into a feature vector by aggregating over all traces.

4. The method according to claim 3, wherein an identifying of features that have above a predetermined level of discriminatory power, include features that arise with a greater frequency in malicious applications compared to benign applications or vice versa.

5. The method according to claim 1, wherein the identifying of discriminating features includes:
   identifying, out of a plurality of available features, those that have above a predetermined level of discriminatory power; and
   outputting, via an algorithm, the discriminating features, where a feature is considered of sufficient discriminatory power from its frequency of occurrence.

6. The method of claim 1, further comprising:
   for each feature, counting a number of vectors which are sets including feature vectors for the malicious and benign applications, respectively such that a non-default vector is determined; and
   normalizing the counts of the number of vectors by dividing by an overall number of benign and malicious vectors,
   wherein the outputting of the discriminating features of after normalizing the counts of the number of vectors, where a feature is considered of sufficient discriminatory power if its frequency of occurrence in malicious or benign application is greater than its frequency of occurrence in benign or malicious application by a predetermined factor.

7. The method according to claim 1, wherein the set of discriminating features are machine-learnable aspects of a program's code that hold true of most applications with one classification but not with other classifications.

8. The method according to claim 1, wherein the determining of the positions of the first application's code, further comprises:
   given the set of discriminating features obtained through an algorithm, determining for correlations between the features and the operation traces arising in an input of the first application; and
   computing a mapping function from the operation traces to discriminating features.

9. The method according to claim 8, further comprising:
   to enable the binding to a program's text, when performing static analysis of the first application in test mode as opposed to offline training, retaining as metadata a source position of each statement;
   if information of the source position is missing, substituting the information with a fully qualified class name, method signature and call site of every operation along the trace;
   while statically analyzing an input application, storing the code positions corresponding to the operation traces it computes; and
   when a machine learning engine makes a determination, tracing model discriminative features consistent with the determination are highlighted in a report.

10. A server, comprising:
    a processor; and
    a computer readable medium storing a program executed by the processor,
    wherein the processor identifies over a set of classified applications a set of discriminating features to differentiate between different classifications of the applications,
    wherein the processor determines via code analysis, when a first application is subjected to classification, positions of the first application's code that correspond to discriminating features by checking for correlations between the discriminating features and operation traces arising in the first application, and
    wherein the processor forwards the positions of the first application's code that correspond to the discriminating features to a classification algorithm, such that according to its output code fragments corresponding to the discriminating features are reported beyond a determination itself of the discriminating features to identify malware.

11. The server according to claim 10, wherein in a case of malware detection, the classification is determined as either "malicious" or "benign".

12. The server according to claim 10, wherein the identifying of the discriminating features is performed offline.

13. The method according to claim 10, wherein the processor identifying of discriminating features includes:
    the processor identifying, out of a plurality of available features, those that above a predetermined level of discriminatory power; and
    the processor outputting, via an algorithm, the discriminating features, where a feature is considered of sufficient discriminatory power from its frequency of occurrence.

14. The sever according to claim 13, wherein the identifying of features that have above a predetermined level of discriminatory power, include features that arise with a greater frequency in malicious applications compared to benign applications or vice versa.

15. The server of claim 10, wherein:
    for each feature, the processor counting a number of vectors which are sets including feature vectors for the malicious and benign applications, respectively such that a non-default vector is determined,
    the processor normalizing the counts of the number of vectors by dividing by an overall number of benign and malicious vectors, and
    the processor outputting of the discriminating features after normalizing the counts of the number of vectors, where a feature is considered of sufficient discriminatory power if its frequency of occurrence in malicious or benign application is greater than its frequency of occurrence in benign or malicious application by a predetermined factor.

16. The server according to claim 10, wherein the set of discriminating features are machine-learnable aspects of a program's code that hold true of most applications with one classification but not with other classifications.

17. The server according to claim 10, wherein the processor determining of the positions of the first application's code, further comprises:

given the set of discriminating features obtained through an algorithm, the processor determining for correlations between the features and the traces arising in an input of the first application; and the processor computing a mapping function from traces to discriminating features.

18. The server according to claim 10, wherein:

to enable the binding to a program's text, when performing static analysis of the first application in test mode as opposed to offline training, the processor retaining as metadata a source position of each statement;

if information of the source position is missing, the processor substituting the information with a fully qualified class name, method signature and call site of every operation along the trace;

while statically analyzing an input application, the processor storing the code positions corresponding to the operation traces it computes; and when a machine learning engine makes a determination, the processor tracing model discriminative features consistent with the determination are highlighted in a report.

19. The server according to claim 10 being implemented in the clouds.

20. A method, comprising:

identifying over a set of classified applications a set of discriminating features to differentiate between different classifications of the applications;

determining via code analysis, when a first application is subjected to classification, positions of the first application's code that correspond to discriminating features by checking for correlations between the discriminating features and operation traces arising in the first application; and forwarding the positions of the first application's code that correspond to the discriminating features to a classification algorithm, such that code fragments corresponding to the discriminating features are reported along with a determination of whether the discriminating features are benign or malicious code fragments to identify malware.

* * * * *